United States Patent [19]

Baxter

[11] 4,444,171
[45] Apr. 24, 1984

[54] ELECTRONIC IGNITION TIMING

[75] Inventor: Keith Baxter, Washington, D.C.

[73] Assignee: Echlin, Inc., Branford, Conn.

[21] Appl. No.: 440,547

[22] Filed: Nov. 10, 1982

[51] Int. Cl.³ .............................................. F02P 5/04
[52] U.S. Cl. .................................. 123/418; 123/414; 123/427
[58] Field of Search ............... 123/418, 414, 415, 427, 123/146.5 A; 307/228

[56] References Cited

U.S. PATENT DOCUMENTS

| | | | |
|---|---|---|---|
| 4,104,997 | 8/1978 | Padgiet | 123/427 |
| 4,276,860 | 7/1981 | Capurka | 123/418 |
| 4,307,691 | 12/1981 | Nagac et al. | 123/418 |
| 4,367,712 | 1/1983 | Sugiura | 123/415 |
| 4,380,983 | 4/1983 | Kobashi et al. | 123/418 |
| 4,389,989 | 6/1983 | Hastig | 123/418 |
| 4,407,246 | 10/1983 | Bayama | 123/415 |

Primary Examiner—Raymond A. Nelli
Attorney, Agent, or Firm—McAulay, Fields, Fisher, Goldstein & Nissen

[57] ABSTRACT

A motorcycle two cylinder asymmetric ignition timing system includes an electronic ignition advance circuit. A spark advance control signal is derived from a base signal which in turn has a magnitude that is representative of the time duration between spark ignition signals and thus is representative of engine speed. The spark is not advanced at engine speeds up to 300 RPM, is advanced 9° between 300 RPM and 800 RPM and is advanced 16° above 800 RPM. Intersection between a ramp signal which has a duration that is an inverse function of engine speed and a base signal that has an amplitude which is an inverse function of engine speed determines the time at which the ignition signal is generated. The lower the base signal, the sooner the intersection of the ramp with the base signal and thus the earlier the ignition signal. In this fashion the desired advance is attained.

14 Claims, 4 Drawing Figures

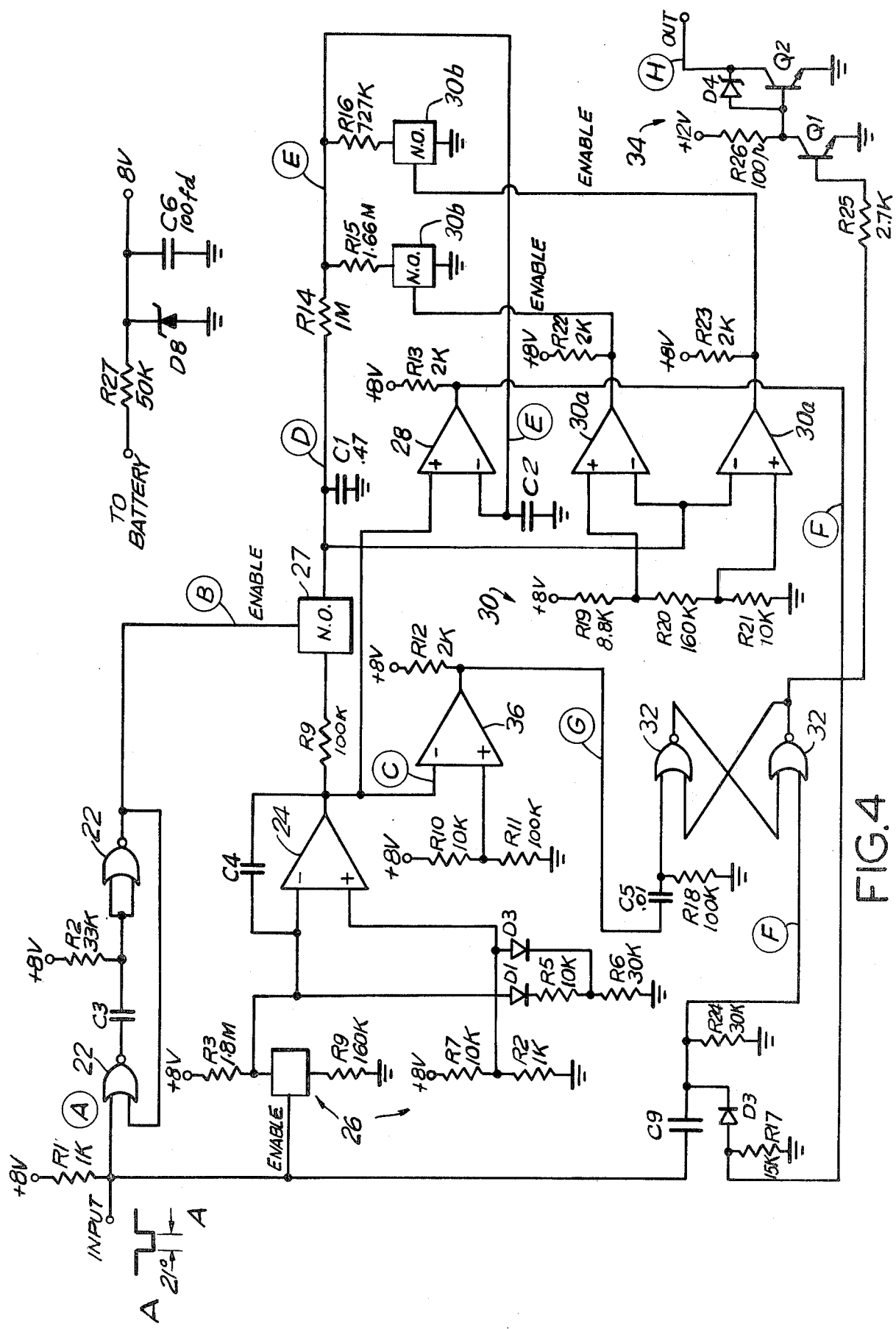

ELECTRONIC IGNITION TIMING

BACKGROUND OF THE INVENTION

This invention relates in general to a technique for timing the spark ignition signal in an engine as a partial function of the engine speed.

In two cylinder motor cycle engines, it is known to mechanically advance the ignition signal with increasing speed in order to provide improved fuel efficiency and enhanced power output. These known mechanical techniques tend to have mechanical problems that adversely affect performance and response to predetermined engine speed thresholds.

Accordingly, it is a purpose of this invention to provide an automatic electronic technique for responding to two cylinder engine speed so as to provide an appropriate ignition signal advance as certain speed thresholds are reached. It is a related purpose of this invention to provide such an electronic device that is simple in structure and requires minimal maintenance. In order for such an improved device to become acceptable in the market, it is a further purpose of this invention that the cost of the electronic ignition advance system be less than the mechanical systems.

BRIEF DESCRIPTION

In brief, one embodiment of this invention provides a pulse train input derived from a notched disk mounted on and rotating with the cam shaft of the engine. Each pulse of the pulse train has a predetermined width of 21 angular degrees out of each 180 degree rotation of the cam shaft. The leading edge of each pulse initiates a ramp signal which is terminated by the trailing edge of the pulse. The maximum amplitude of the ramp is a function of the real time width of the 21 degree pulse and thus inversely proportional to the engine's speed.

The peak of the ramp is sampled, and the voltage thereby detected is substantially held by a capacitive holding circuit to provide a base voltage signal that is substantially D.C. The ramp signal and the base voltage signal are applied to respective terminals of a comparator circuit to provide an ignition timing pulse when the ramp signal crosses the base voltage signal. The base voltage signal input to the comparator is however modified as a function of engine speed. In particular, at certain engine speed points, the base voltage input to the comparator is reduced by predetermined amounts thereby causing an earlier intersection between the rising ramp signal and the substantially D.C. base voltage signal applied to the comparator. In this fashion, the timing signal output of the comparator is advanced when engine speed exceeds certain predetermined magnitudes.

Because of the capacitive holding circuit on the base voltage (or modified base voltage signal) that D.C. voltage input signal to the comparator is held at a value substantially determined by the peak of the ascending ramp signal of the immediately preceeding engine ignition cycle. In this fashion, the point (in terms of number of degrees of the 21 degree pulse width) at which the timing signal is generated tracks with engine speed. However, when certain threshold engine speeds are achieved (in particular at engine speeds of 300 RPM and 800 RPM in this embodiment) the base voltage level is reduced by predetermined amounts thereby causing a predetermined shift, and in particular an advance, in the angular position within the 21 degree input pulse width where the ignition occurs.

The timing signal is generated within the 21 degree pulse and all advance occurs within that 21 degree window. Thus the invention can be used with asymmetric firing engines because the number of degrees between each 21 degree window is irrelevant.

BRIEF DESCRIPTION OF THE FIGURES

FIG. 4 is a more detailed block and schematic diagram of the FIG. 2 circuitry.

DESCRIPTION OF THE PREFERRED EMBODIMENTS

Figure 1:
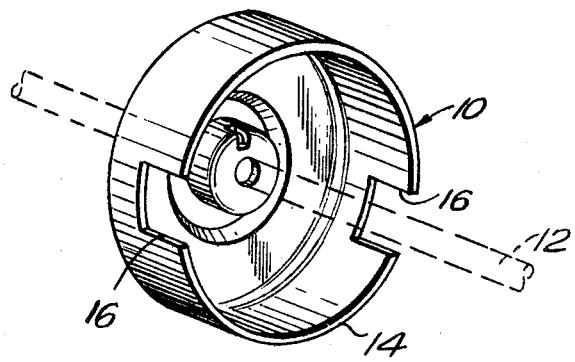
FIG. 1 is a perspective view of the notched rotor element mounted on the cam shaft of the engine. This is the basic mechanical element that provides the signal, which is a function of engine speed, that is processed by the circuitry of this invention to control ignition advance.

FIG. 1 illustrates one embodiment of a rotor 10 which is mounted on the cam shaft 12 and thus rotates at an angular velocity equal to that of the engine speed. A Hall trigger or photo cell circuit coupled across the wall 14 of this rotor 10 is interrupted by the wall 14 and reestablished by the notches 16. Each notch 16 represents 21° out of 360° circle established by the wall 14. It is in this fashion that each notch 16 establishes the 20° pulse that constitutes the pulse train A. In one embodiment, the notches 16 are not 180° apart. Thus the angular time between successive pulses differs and an asymmetric ignition arrangement occurs. This asymmetric ignition is known in certain motorcycle engines. In one embodiment, the rotor has a 21° notch, a 148° wall, a 21° notch and a 172° wall.

Figure 2:
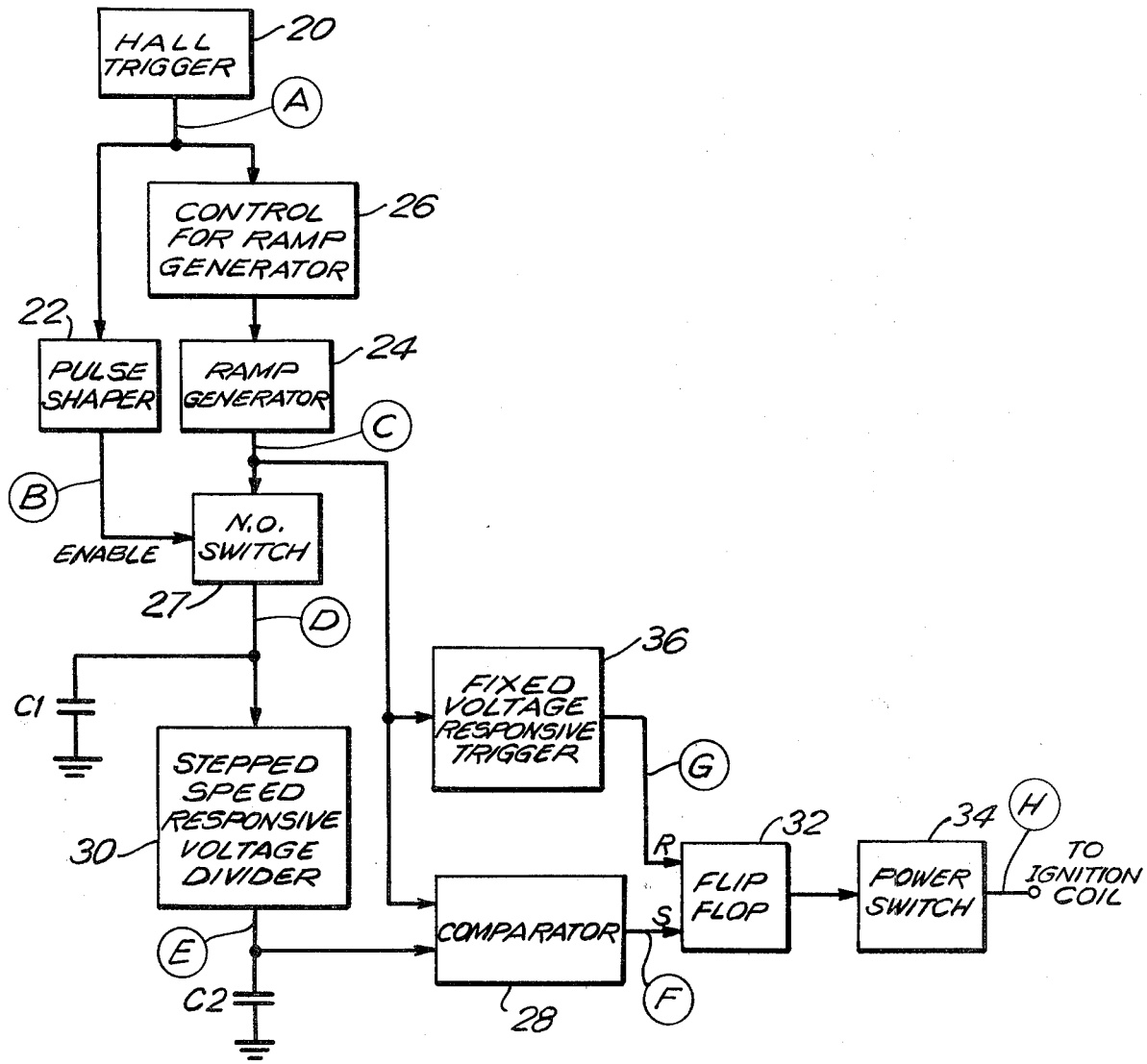
FIG. 2 is a block diagram of the circuitry which responds to the output pulses from the cam shaft to provide ignition timing control as a function of engine speed.
Figure 3:
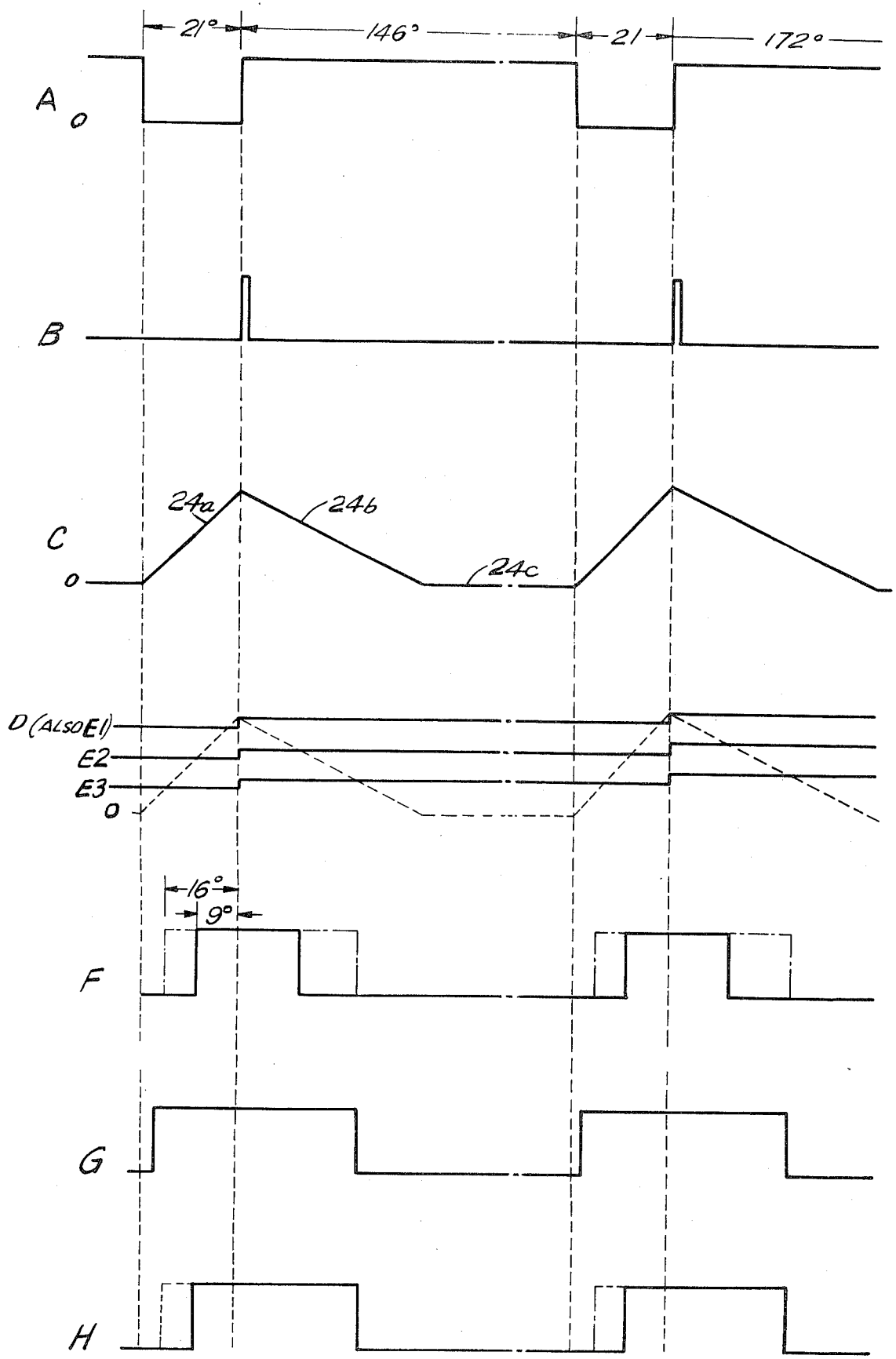
FIG. 3 is a series of wave form diagrams illustrating the output signal at various points in the circuitry shown in FIG. 2.

With reference to FIGS. 2 and 3, a Hall trigger 20 is coupled to the rotor 10 so as to provide a pulse train A having a pulse width equal to 21° out of each 180° rotation of the cam shaft thereby providing a pulse representing each cylinder firing. A one-shot circuit which fires on the rising edge of the negative going pulse A operates as a pulse shaper circuit 22 to provide a train of relatively sharp pulses B. A ramp generator 24 provides the fairly complex rising ramp 24a, decending ramp 24b and stable level 24c voltage configuration of the signal C as shown in FIG. 3. A control circuit 26 is responsive to each pulse A to provide the desired control which causes the ramp generator 24 to provide the signal C. Essentially, in the signal C, the ascending ramp segment 24a occurs only for the duration of the 21° pulse A. Thus the faster the engine turns, the shorter in time will be the duration of this 21° pulse signal A and the lower will be the peak of the ascending ramp segment 24a. In this fashion, a maximum voltage is established which is a function of the duration of the pulse A and thus an inverse function of the speed of the engine.

The pulse B (which is generated by the rising trailing edge of the pulse A) closes the normally open switch 27 for the short period of time determined by the fairly sharp pulse B thereby sampling the peak voltage of the ascending ramp segment 24a of the signal C to charge the capacitor C1. This provides a voltage level D on the capacitor C1. This voltage level D will gradually decay and is re-established once for each incidence of the cam shaft derived pulse A. In this fashion, a substantially constant base voltage level D is established.

A comparator 28 compares a modified base voltage E (which is the voltage D or some fraction thereof) against the next rising ramp segment 24a of the signal C to provide a timing signal F for the ignition. This timing signal F is generated when the rising ramp 24a segment of the signal C crosses over and exceeds the level of the substantially constant voltage input E to the comparator 28. The larger the signal E to the comparator 28, the later will the timing signal F be generated.

Since it is desired to advance the timing signal F as a function of speed, it is desired to reduce the magnitude of the modified base signal E applied to the comparator 28 in stages as the engine speed increases. As shown in FIG. 1, these stages are to provide substantially no advance up to 300 RPM, a first level of advance of 9° between 300 RPM and 800 rmp and a second level of advance of 16° above 800 RPM.

The stepped speed responsive voltage divider network 30 provides the desired division of the main base voltage level D to provide the modified base voltage E. The manner in which this is performed is shown in connection with FIG. 4. Suffice it to state here that fixed circuit voltage levels are established within the network 30 that correspond to the level of the main base voltage D that occurs at the predetermined engine speed levels of 300 RPM and 800 RPM respectively. Comparators within the divider network 30 compare the main base voltage D against these fixed voltage levels. These comparators switch in appropriate voltage divider networks when the voltage D corresponds to the engine speed at which reduced voltage levels E2 or E3 are required (see FIG. 3). When the input voltage E to the comparator 28 is thereby reduced, the point in time when the ascending portion 25 of the ramp C crosses the voltage E will be advanced, as shown in FIG. 3, to thereby provide an advanced timing signal F.

This timing signal F operates as the set signal for a flip-flop circuit 32 to provide a control signal which is amplified (and, in this circuit, reversed in polarity) by the power switch 34 to provide the input signal H to the ignition coil. This signal H causes the ignition coil to fire the cylinder. In this fashion, the ignition coil is fired earlier in time when the comparator input signal E is reduced below that level provided by the main base voltage D.

The capacitor C2 maintains the voltage E between cycles. The slight bleeding off of the capacitor C2 is made up in each cycle by virtue of the closing, once each cycle, of the normally open switch 27.

The flip-flop circuit 32 is a bistable device. It has to be reset once each cycle. Reset is achieved by the operation of the fixed voltage responsive trigger 36. This trigger 36 is shown in greater detail in FIG. 4. Briefly, the trigger 36 has an internal fixed voltage which is compared against the complex ramp signal C. When the descending segment 24b of the ramp signal C crosses over and below the fixed voltage of the trigger 36, the trigger 36 provides an output signal G which serves to reset the flip-flop 32. The asymmetric firing of an embodiment using the FIG. 1 rotor 10 does not affect the timing of the advance within the 21° window. The reset occurs within the time between the 21° pulses along the decending ramp 24b. Thus the length of the portion 24c of the signal C is substantially unimportant and will not affect the operation described.

FIG. 4 is a more detailed block and schematic diagram of the arrangement shown in block form in FIG. 2. The reference numbers employed in FIG. 2 are also employed in FIG. 4 to indicate the major components of the corresponding FIG. 2 units. Similarly, the wave forms of FIG. 3 are appropriately located by the letter reference numbers in FIG. 4. The operation of the detailed circuitry shown in FIG. 4 will be apparent to one skilled in this art and only a few comments with respect to the voltage divider network 30 should be necessary. The resistors R19, R20 and R21 constitute the voltage divider which provides two reference level inputs for the differential amplifier units 30a. These two fixed inputs are those that correspond to the level of the main base voltage D when the predetermined engine speed levels are respectively of 300 RPM and 800 RPM. The other input to the comparators 30a is the main base voltage D. The appropriate one of the comparators 30a is switched on when the main base voltage D has a value corresponding to the engine speed at which reduced voltage levels are required. Turning on a comparator 30a closes the appropriate one of the normally open switches 30b. This connects first one and then both of the resistors R16 and R15 into the circuit by completing connections to ground. In this fashion an appropriate voltage divider network composed of one or more of the resistors R14, R15 and R16 is switched in to provide a reduced voltage level when desired.

In particular, when both of the switches 30b are open, the voltage level E1 (which is the same as the voltage level D), is provided. When the switch 30b associated with the resistor R16 is closed the voltage divider network R14, R16 provides the voltage level E2. When the switch 30b associated with resistor R15 is also closed, the voltage divider network composed of resistors R14, R15 and R16 provides the voltage level E3. The appropriate one of the voltage levels E1, E2 or E3 is applied as one of the inputs to the comparator 28. Accordingly, the timing signal F will be advanced appropriately as the value of E is reduced because the ascending ramp portion 24a of the signal C, which is the other input at the comparator 28, will exceed the value E earlier as the value of the voltage E decreases.

What I claim is:

1. In an electronic ignition system, the timing circuit improvement to provide an advance in the ignition as a function of engine speed, comprising:
    first means responsive to engine speed to generate a base signal having a magnitude representative of the time duration between spark ignition signals and thus being an inverse function of engine speed,
    ramp generator means responsive to engine speed to provide a ramp signal having a duration that is an inverse function of engine speed,
    modifier means coupled to said base signal to provide a modified base signal having a magnitude that is reduced by predetermined amounts as a function of predetermined increases in engine speed,
    first comparator means to compare said modified base signal and said ramp signal to provide a spark ignition signal when said ramp signal exceeds said modified base signal.

2. The ignition timing system of claim 1 wherein:
    said first means to provide said base signal includes a sampling means for sampling substantially the maximum value of said ramp signal to provide said base signal that substantially equals the peak of said ramp signal, when said engine speed is below a first threshold, said modified base signal being substantially equal to said base signal and thus substantially equal to the peak of said ramp signal, whereby below said first threshold engine speed, the ignition signal provided by said circuit is at a non-advanced predetermined point in the engine cycle.

3. The ignition timing system of claim 1 further comprising:

indicator means mounted for rotation with a shaft of the engine to provide a pulse signal once for each engine ignition cycle, said pulse having a predetermined angular width duration which is an inverse function of engine speed, said ramp generator being responsive to the leading edge of each of said pulse signals to start an ascending ramp signal substantially coincident in time with the leading edge of said pulse, said ramp generator being responsive to the trailing edge of said pulse signal to terminate the ascending ramp signal substantially coincident with the said trailing edge of said pulse.

4. The ignition timing system of claim 2 further comprising:

indicator means mounted for rotation with a shaft of the engine to provide a pulse signal once for each engine ignition cycle, said pulse having a predetermined angular width duration which is an inverse function of engine speed, said ramp generator being responsive to the leading edge of each of said pulse signals to start an ascending ramp signal substantially coincident in time with the leading edge of said pulse, said ramp generator being responsive to the trailing edge of said pulse signal to terminate the ascending ramp signal substantially coincident with the said trailing edge of said pulse.

5. The ignition timing system of claim 3 wherein:

said first means to provide said base signal includes sampling means actuated by said trailing edge of said pulse signal to sample the magnitude of said ramp substantially at the time when said trailing edge of said pulse occurs, and holding circuit means coupled to said sampling means to substantially hold the value of said ramp signal when sampled by said sampling means to provide a substantially D.C. base signal value which tracks in value with engine speed.

6. The ignition timing system of claim 4 wherein:

said first means to provide said base signal includes sampling means actuated by said trailing edge of said pulse signal to sample the magnitude of said ramp substantially at the time when said trailing edge of said pulse occurs, and holding circuit means coupled to said sampling means to substantially hold the value of said ramp signal when sampled by said sampling means to provide a substantially D.C. base signal value which tracks in value with engine speed.

7. The ignition timing system of claim 1 wherein:

reset means responsive to an event subsequent to termination of said ramp signal to reset said first comparator means.

8. The ignition timing system of claim 4 wherein:

reset means responsive to an event subsequent to termination of said ramp signal to reset said first comparator means.

9. The ignition timing system of claim 7 wherein:

said ramp generator provides a complex periodic signal comprising said ramp signal followed by an inverse ramp signal followed by a quiescent period, and and reset means is responsive to a magnitude of said inverse ramp signal to provide said reset.

10. The ignition timing system of claim 8 wherein:

said ramp generator provides a complex periodic signal comprising said ramp signal followed by an inverse ramp signal followed by a quiescent period, and said reset means is responsive to a magnitude of said inverse ramp signal to provide said reset.

11. The ignition timing system of claim 1 wherein: said base signal and said modified base signal during any given ignition cycle is derived from the ramp signal of the immediately preceeding engine ignition cycle.

12. The ignition timing system of claim 2 wherein: said base signal and said modified base signal during any given ignition cycle is derived from the ramp signal of the immediately preceeding engine ignition cycle.

13. The ignition timing system of claim 9 wherein: said base signal and said modified base signal during any given ignition cycle is derived from the ramp signal of the immediately preceeding engine ignition cycle.

14. The ignition timing system of claim 10 wherein: said base signal and said modified base signal during any given ignition cycle is derived from the ramp signal of the immediately proceeding engine ignition cycle.

* * * * *